US012532105B2

(12) United States Patent
Jelliffe

(10) Patent No.: US 12,532,105 B2
(45) Date of Patent: *Jan. 20, 2026

(54) PERSONAL AUDIO UNIT AND MANUFACTURING METHOD THEREOF

(71) Applicant: Tzuka Ltd, Loughborough (GB)

(72) Inventor: Thomas Jelliffe, London (GB)

(73) Assignee: Tzuka Ltd, Loughborough (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/835,780

(22) PCT Filed: Oct. 18, 2023

(86) PCT No.: PCT/GB2023/052707
§ 371 (c)(1),
(2) Date: Aug. 5, 2024

(87) PCT Pub. No.: WO2024/089393
PCT Pub. Date: May 2, 2024

(65) Prior Publication Data

US 2025/0159400 A1 May 15, 2025

(30) Foreign Application Priority Data

Oct. 25, 2022 (GB) ..................................... 2215802

(51) Int. Cl.
*H04R 1/10* (2006.01)
*H04R 25/00* (2006.01)

(52) U.S. Cl.
CPC ......... *H04R 1/1075* (2013.01); *H04R 1/1016* (2013.01); *H04R 1/1041* (2013.01);
(Continued)

(58) Field of Classification Search
CPC .. H04R 1/1075; H04R 1/1016; H04R 25/554; H04R 25/658; H04R 1/1041;
(Continued)

(56) References Cited

U.S. PATENT DOCUMENTS 6,761,789 B2 7/2004 Juneau et al.
2002/0198437 A1 12/2002 Juneau et al.
(Continued)

FOREIGN PATENT DOCUMENTS

CN 210351533 U 4/2020
GB 2623773 A 5/2024
(Continued)

OTHER PUBLICATIONS

Peter Easterfield (UKIPO), Combined Search and Examination report under Sections 17 & 18(3), mailed Mar. 24, 2023 for GB2215802.6 (3 pages).
(Continued)

*Primary Examiner* — Angelica M Mckinney
(74) *Attorney, Agent, or Firm* — Gutwein Law; Tyler B. Droste

(57) ABSTRACT

A personal audio unit, PAU, is described. The PAU comprises: a shell forming a cavity within the shell; an electronics module located within the cavity; wherein the cavity includes a solidified encapsulant contacting at least a portion of the electronics module and an internal wall of the shell. A method of manufacturing a personal audio unit, PAU, is described. The method including the steps of: forming a shell, the shell forming a cavity therein, the shell having a filling port into the cavity; locating an electronics module within the cavity; introducing a liquid encapsulant into the cavity via the filling port such that the liquid encapsulant enters interstices between the electronics module and an internal surface of the shell, and; curing the liquid encapsulant to form a solid encapsulant.

12 Claims, 12 Drawing Sheets

(52) U.S. Cl.
CPC ......... *H04R 25/554* (2013.01); *H04R 25/658* (2013.01); *H04R 2420/07* (2013.01)

(58) Field of Classification Search
CPC .............. H04R 2420/07; H04R 1/1058; H04R 1/1091; H04R 5/033; H04R 25/60; H04R 25/602; H04R 25/603; H04R 25/604; H04R 25/609; H04R 25/65; H04R 2201/10; H04R 2225/025
See application file for complete search history.

(56) References Cited

U.S. PATENT DOCUMENTS

| | | | | |
|---|---|---|---|---|
| 2007/0071265 A1* | 3/2007 | Leedom | H04R 25/652<br>381/322 |
| 2012/0195449 A1* | 8/2012 | Thiede | H04R 25/305<br>381/315 |
| 2021/0235210 A1* | 7/2021 | Kröni | H04R 25/604 |
| 2022/0400350 A1* | 12/2022 | De Vries | H04R 25/505 |

FOREIGN PATENT DOCUMENTS

| | | |
|---|---|---|
| GB | 2623926 A | 5/2024 |
| GB | 2623773 B | 10/2024 |

OTHER PUBLICATIONS

Applicant's response to the Combined Search and Examination report under Sections 17 & 18(3), mailed Mar. 24, 2023 for GB2215802.6, submitted Dec. 22, 2023 (5 pages).

Peter Easterfield (UKIPO), Response made to Report under Section 18(3), mailed Jan. 8, 2024 for GB2215802.6 (1 page).

Andy Bartlett (UKIPO), Notification of Grant: Patent Serial No. 2623773, mailed Oct. 1, 2024 for GB2215802.6 (2 pages).

Peter Easterfield (UKIPO), Search Report under Section 17, mailed Mar. 23, 2023 and Combined Search and Examination report under Sections 17 & 18(3), mailed Mar. 24, 2023 for GB2215802.6 (8 pages).

* cited by examiner

PERSONAL AUDIO UNIT AND MANUFACTURING METHOD THEREOF

FIELD OF THE INVENTION

The present invention relates to personal audio units, and particularly, although not exclusively, to a resilient personal audio unit and a method of manufacture of a resilient personal audio unit.

BACKGROUND

Personal audio units take many forms. At the most general, personal audio units provide sound directly to the ear(s) of a user, often taking the form of a unit that engages with the ear or a pair of units that engage with respective ears. The pair of units may be physically connected with each other, for example via a head- or neck-band, or via an interconnecting wire. The pair of units may be wirelessly interconnected with one another, for example via a Bluetooth connection.

Portable audio units are directly connected to the ears or a user, either engaging with the ear, being retained against the ear, or a combination of the two. There is a risk that a portable audio unit can fall from the user's ear(s). When this happens, there is a risk of damage to the portable audio unit housing or the various components located within. Portable audio units are generally small. They are easy to misplace. When misplaced they are at risk of again being inadvertently damaged, for example being stood on.

A personal audio unit becoming disengaged/dislodged from the user's ears is a particular risk during physical activity, for example during exercise, for example while running or while exercising at a gym, for example during "CrossFit" or powerlifting. Periods of physical activity may also coincide naturally with times when a dislodged portable audio unit is at risk of damage if dropped, for example being stepped on. It is important personal audio u nits are shock proof and resistance to impacts. Typical environments in which physical activity take place may also be potentially damaging to personal audio units, for example hard floors, muddy areas, puddles and the like.

Furthermore, there is a need to have personal audio units that are resistant to damage via liquid ingress and/or dust or dirt ingress. For example, being waterproof, water resistant, or sweat proof is an important characteristic. During physical activity this is particularly true, when sweating is likely, or when swimming or showering, for example.

The present invention has been devised in light of the above considerations.

SUMMARY OF THE INVENTION

The invention includes the combination of the aspects and preferred features described except where such a combination is clearly impermissible or expressly avoided.

According to a first aspect, a personal audio unit, PAU is provided. The PAU comprises a shell forming a cavity within the shell and an electronics module located within the cavity. Optionally, the cavity includes a solidified encapsulant contacting at least a portion of the electronics module and an internal wall of the shell. In this way, a PAU that may be resistant to damage is formed. The present inventors have tested the PAU according to the present invention, and found that it performs well in impact resistance testing and weight drop testing. In particular, the solidified encapsulant may improve the structural integrity of the shell. The solidified encapsulant may also improve the resistance to water/sweat and dirt/dust damage.

Optionally, the shell is a substantially rigid shell or a rigid shell. The shell is rigid enough to maintain its shape in the absence of external forces. In some embodiments the shell is formed from a plastic material, for example a nylon material.

Optionally, the electronics module comprises a power supply unit located within a cup, the cup being located within the cavity. In some embodiments the power supply unit includes a battery unit.

Optionally, the cup is substantially surrounded by the encapsulant. In some embodiments, the inside of the cup, in which the power supply unit is located, is substantially free of encapsulant.

Optionally, the cup is formed from a rigid material, for example a plastic. In some other embodiments, the cup is formed from a resilient material, for example a foam, for example a closed cell foam.

Optionally, the PAU includes a sound driver configured to provide sound to a user, wherein a sound emitting portion of the sound driver is exposed from the encapsulant. In this way, a sound transmission passage, free of encapsulant, is provided. This may lead to improved audio performance and shock proofing.

Optionally, a body portion of the sound driver is housed or coated in a flexible or elastic material, for example a latex or silicone. The flexible or elastic coating is located between the body portion of sound driver and the solidified encapsulant. The flexible or elastic coating provides some cushioning between the sound driver and the solidified encapsulant.

Optionally, the cavity is partitioned into an upper void and a lower void.

Optionally, the encapsulant is located in the lower void, and the upper void is substantially free of encapsulant. The upper void may provide a location for electronic components that could be damaged by the encapsulant, or components with performance characteristics that could be worsened by the presence of the encapsulant.

Optionally, the cavity is partitioned by a partition portion of the electronics module. In some embodiments, the partition portion of the electronics module is a circuit board. In this way, the number of components in the PAU may be reduced, since a PCB is acting as both a PCB (holding electronics components) and as a partition wall in the cavity.

Optionally, an upper surface of the partition portion that faces into the upper void includes at least one user interface component. In some embodiments, at least one user interface component includes a switch for user control of the PAU.

Optionally, the at least one user interface component includes a light for providing user feedback of an operation of the PAU.

Optionally, the PAU includes at least one power electrical contact for charging the power supply unit, the at least one electrical contact being electrically connected to the electronics module.

Wherein the PAU includes at least one data electrical contact for data transfer to and/or from the electronics module.

Optionally, the electronics module includes a memory module for storing data for playback by the PAU. In this way, the PAU can be used for audio playback in the absence of a (e.g., wirelessly) connected data source, for example a mobile telephone.

Optionally, the upper void is at least partially bounded by a flexible wall. The flexibility permits the user to deform the flexible wall to engage a switch within the PAU.

Optionally, the PAU includes at least one support structure in the cavity to engage the electronics module. In this way, the electronics module is supported within the cavity during encapsulant introduction. In some embodiments, the PAU includes a plurality of such support structures. The electronics module may have an engagement feature to engage with a particular support structure. In this way, proper alignment of the electronics module within the cavity may be achieved.

Optionally, the at least one support structure is an integrally formed part of the shell. In other words, the at least one support structure may be formed from the same material as the material of the shell. This may permit simpler manufacture.

Optionally, the encapsulant is a potting compound. In some embodiments, the potting compound is a two-part epoxy resin.

Optionally, the electronics module includes a wireless communication unit. In some embodiments, the wireless communication unit includes an antenna. In some embodiments, the antenna is exposed from the encapsulant, for example the antenna may be located within the upper void.

Optionally, the PAU is an earbud. Optionally, the PAU is a hearing aid.

Optionally, an external profile of the PAU is shaped for engagement with a user's ear.

According to a second aspect, a personal audio system is provided. The system includes a pair of PAUS, each PAU of the pair being according to the first aspect.

Optionally, the system includes a case configured to house the pair of PAUs. In some embodiments the case is a charging case configured to charge the power supplies of the PAUS when the PAUS are engaged with the case. In some embodiments, the case is a carrying case, configured to house the PAUS when not in use. In some embodiments, the case is a carrying case and a charging case.

Optionally, the case includes a case power supply unit, the case power supply unit configured to supply power to the power supply unit of each PAU.

Optionally, an external profile of a first of the pair is shaped for engagement with a user's left ear, and an external profile of a second of the pair is shaped for engagement with a user's right ear.

According to a third aspect, a method of manufacturing a personal audio unit, PAU, is provided. The method includes the steps of: forming a shell, the shell forming a cavity therein, the shell having a filling port into the cavity; locating an electronics module within the cavity; introducing a liquid encapsulant into the cavity via the filling port such that the liquid encapsulant enters interstices between the electronics module and an internal surface of the shell, and; curing the liquid encapsulant to form a solid encapsulant.

Optionally the shell is a substantially rigid shell or a rigid shell. The shell is rigid enough to maintain its shape in the absence of external forces. In some embodiments the shell is formed from a plastic material, for example a nylon material.

Optionally, the method includes a step of vibrating the shell during or after the introduction of the liquid encapsulant. In this way, the encapsulant intrusion into interstices between the electronics module and the shell can be improved.

Optionally, the method includes partitioning the cavity into an upper void and a lower void. Optionally, the partition is formed by a partition portion of the electronics module.

Optionally, introducing the liquid encapsulant comprises introducing the liquid encapsulant into the lower void.

Optionally, the shell includes a venting aperture, the method including introducing a passage member through the venting aperture, a portion of the passage member being located within the cavity during liquid encapsulant introduction and during curing of the liquid encapsulant.

Optionally, the method includes withdrawing the passage member after the curing of the liquid encapsulant, thereby forming a passage through the solidified encapsulant.

Optionally, the electronics module includes a power supply unit, the passage being located between the venting aperture and the power supply unit.

Optionally, forming the shell includes connecting at least two shell parts to one another, with the electronics module located within the cavity thereby formed. In some embodiments, an adhesive is provided between the connection point of at least two shell parts.

Optionally, the method includes attaching a nib to the PAU, for example to the filling port. Optionally, the nib is configured for attachment to the ear canal engaging unit.

Optionally, the liquid encapsulant introduction comprises introducing the liquid encapsulant into the lower void via the filling port.

Optionally the method includes engaging a plug with the filling port.

Optionally the plug is brought into contact with the liquid encapsulant.

Optionally the nib is configured for attachment to an ear canal engaging unit. Optionally, the nib is shaped for attachment to an ear canal engaging unit.

The features described in respect of the first or second aspects may be implemented in the third aspect. Features described in respect of the third aspect may be implemented in the first or second aspects.

SUMMARY OF THE FIGURES

Embodiments and experiments illustrating the principles of the invention will now be discussed with reference to the accompanying figures in which.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 1:
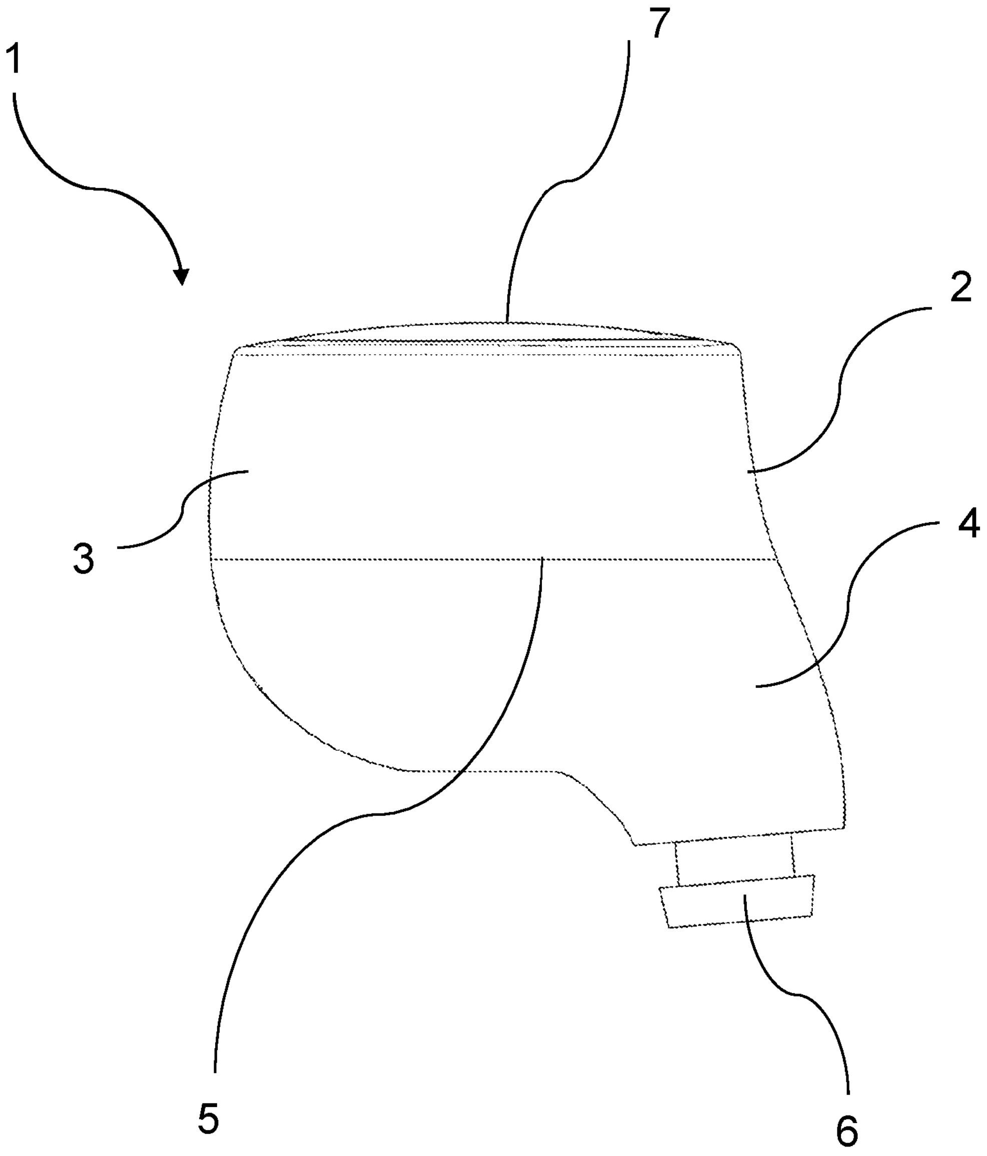
FIG. 1 shows an embodiment of a personal audio unit according to the present invention.

FIG. 1 shows an earbud 1. Earbud 1 is an example of a personal audio unit according to the present invention. Other examples include an earphone, headphone, headset (for example a "Bluetooth headset"), a radio unit, for example a military radio (or earpiece portion thereof), and a hearing aid.

The earbud 1 is formed from an external shell 2. The external shell 2 includes upper shell portion 3 and lower shell portion 4. The upper 3 and lower 4 shell portions are formed from a substantially rigid material. In examples, the material of the shell 2 is a rigid plastic material, for example a rigid nylon material. In some embodiments, the material of the shell 2 is polyamide-12. In some other embodiments, the shell may be formed from a flexible nylon. The shell is rigid enough to maintain its shape in the absence of external forces. The upper 3 and lower 4 shell portions are physically engaged with one another along shell interface 5. In embodiments, the upper 3 and lower 4 shell portions may be connected with one another using an adhesive (not shown). The shell 2 of the earbud 1 is shaped to sit snugly in the concha region of the user's ear between the antihelix and the antitragus. It will be appreciated that some embodiments may not be so shaped. Some embodiments are shaped with a portion to hang around the outside of the user's ear. In some embodiments, the PAU is retained against the user's ear, for example via a headband attached to the personal audio unit.

The earbud 1 includes a nib 6. The nib 6 is located on a side of the earbud 1 that is for engagement with the user's ear. The nib 6 is for connection to an earbud tip (not shown in Figure I). The earbud tip is formed from a flexible material for comfortable engagement with an outer portion of a user's ear canal. The engagement of the earbud tip with the user's ear canal may provide sound isolation from external sounds. The earbud tip may be a user replaceable component. Furthermore, the user may select an earbud tip that is of a suitable size for their ear canal. This permits comfortable but secure connection of the earbud to the ear canal. The nib 6 may be formed from a different material to the shell 2. The material of the nib 6 may be flexible. In some embodiments, the material of the nib 6 is more flexible than the material of the shell 2. In some embodiments, the nib has a shore hardness of 88A. In some embodiments, the nib 6 is a separate, replaceable component from the shell 2. In some embodiments, the nib 6 is a separate component that is engaged with the shell 2 during manufacture, but the nib 6 is not user removable or replaceable. In the embodiment of FIG. 1, the nib 6 is a separate component that is physically engaged with the lower shell portion 4. To engage with the shell, the nib 6 includes a barb that engages with an edge of the shell 2 to retain the nib 6 in position. In some embodiments the nib 6 is formed from TPU (thermoplastic polyurethane). In other embodiments, the nib 6 is integrally formed with a portion of the shell 2.

The earbud 1 also includes a cap 7. The cap 7 covers an aperture formed in upper shell portion 3. The cap 7 is formed from a flexible material, for example a material that is more flexible than the material of the shell 2. In some embodiments, the cap 7 is formed from TPE (soft flexible filament). The cap is flexible to allow for a slight movement of the cap 7 material when pressed by a user. In some embodiments, the cap 7 has a shore hardness of 88A.

In some embodiments, the cap 7 is integrally formed with the shell, or with the upper shell portion. In such embodiments, the flexibility of the material of the cap may be sufficient to permit the user interactions described below in respect of the (separate) cap 7. In such embodiments, the material that forms the cap/shell/shell portion may be thinned in the region of the cap, to increase cap flexibility in the cap region.

As will be discussed later, the cap 7 permits user interaction with the electronics located within the earbud 1, for example controlling some operations of the earbud 1. The cap 7 is located on a side of the earbud 1 that is exposed when the earbud 1 is engaged with the user's ear. In some embodiments, the nib 6 and the cap 7 are located on opposing sides of the earbud 1. In some embodiments, the nib 6 and the cap 7 are located on opposing sides of the shell 2. In some embodiments, the nib 6 is located within a first shell portion (e.g. the lower shell portion 4) and the cap 7 is located within a second shell portion (e.g. the upper shell portion 3). In some embodiments, the cap 7 is formed from a rigid material.

Figure 2:
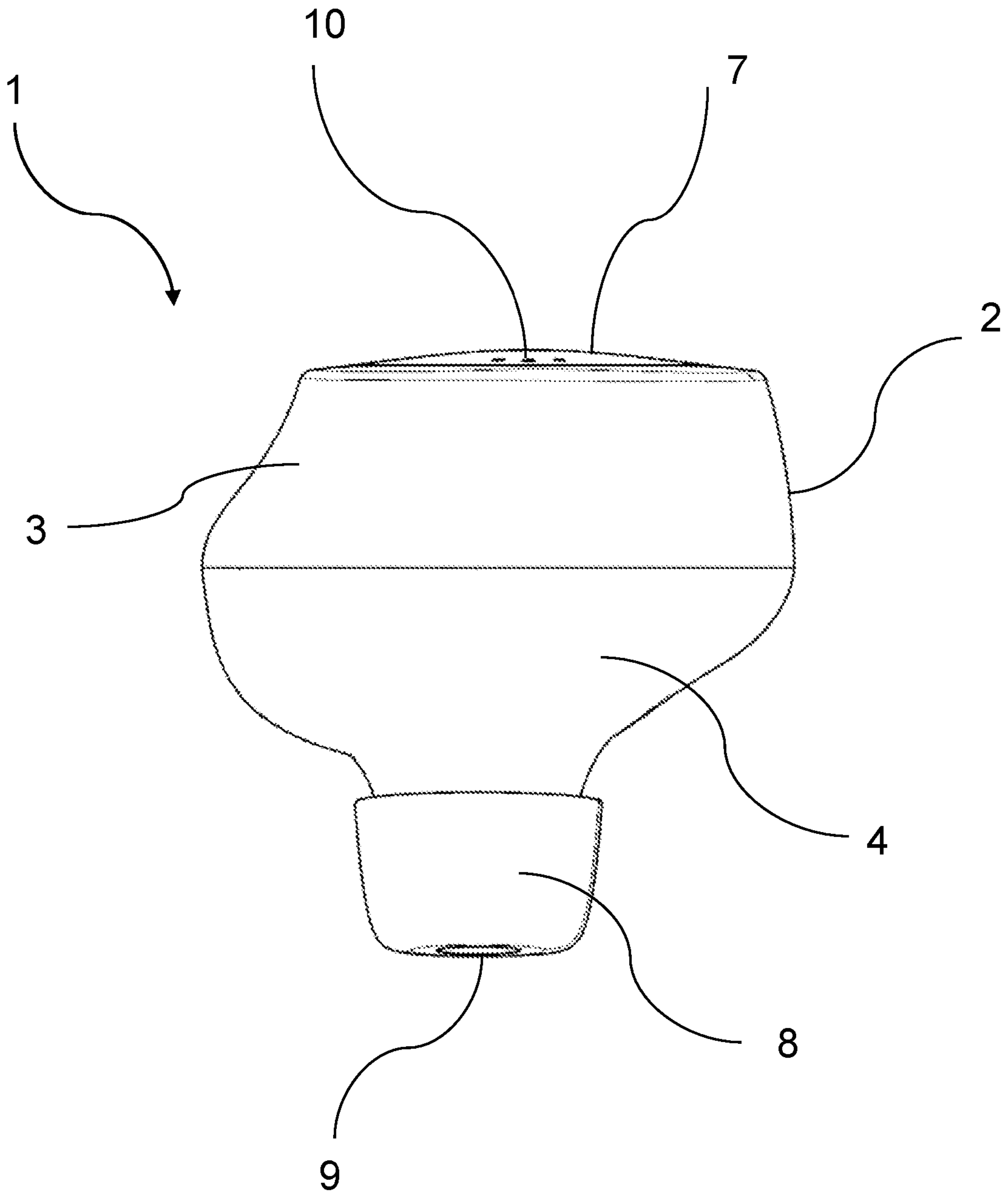
FIG. 2 shows an alternative view of the embodiment of a personal audio unit according to the present invention.

FIG. 2 shows an alternative view of the earbud 1. An earbud tip 8 is shown connected to the nib 6, which is not visible in FIG. 2. Earbud tip 8 includes a sound passage 9, which permits the passage of sound from an audio unit (not shown in FIG. 2), located within the earbud 1, to the user's ear canal. Earbud 1 includes three microphone holes 10 located in the cap 7. Three microphone holes 10 are exemplified, but the skilled person will readily appreciate that other embodiments may have more or fewer microphone holes, including a single microphone hole 10. The microphone holes 10 each include a microphone breathable membrane across the microphone hole 10. Each breathable membrane substantially prevents ingress of liquid and or dirt/dust from outside the earbud 1 through the microphone breathable membrane into the cavity inside the shell 2. The microphone holes 10 and microphone breathable membranes permit the passage of external sound to a microphone (not shown) located within the earbud 1. In some embodiments, a single membrane is provided to cover multiple microphone holes. This external sound may be utilised for example for conducting telephone calls, voice control, or for noise cancelling purposes. In some embodiments, the earbud 1 has no microphone and no microphone hole(s) 10. In some embodiments, the earbud 1 has a microphone, but does not have any microphone hole(s) 10. In such embodiments, sound may reach the microphone via transmission through the cap 7 and/or shell 2. In some embodiments, the earbud 1 includes more than one microphone, for example four microphones.

The breathable membrane may be a waterproof and breathable membrane. Suitable breathable membranes are available from GORE. 2. In some embodiments, the breathable membrane may have a thickness between 0.1 and 1.0 millimetres, for example 0.25 millimetres.

Figure 3:
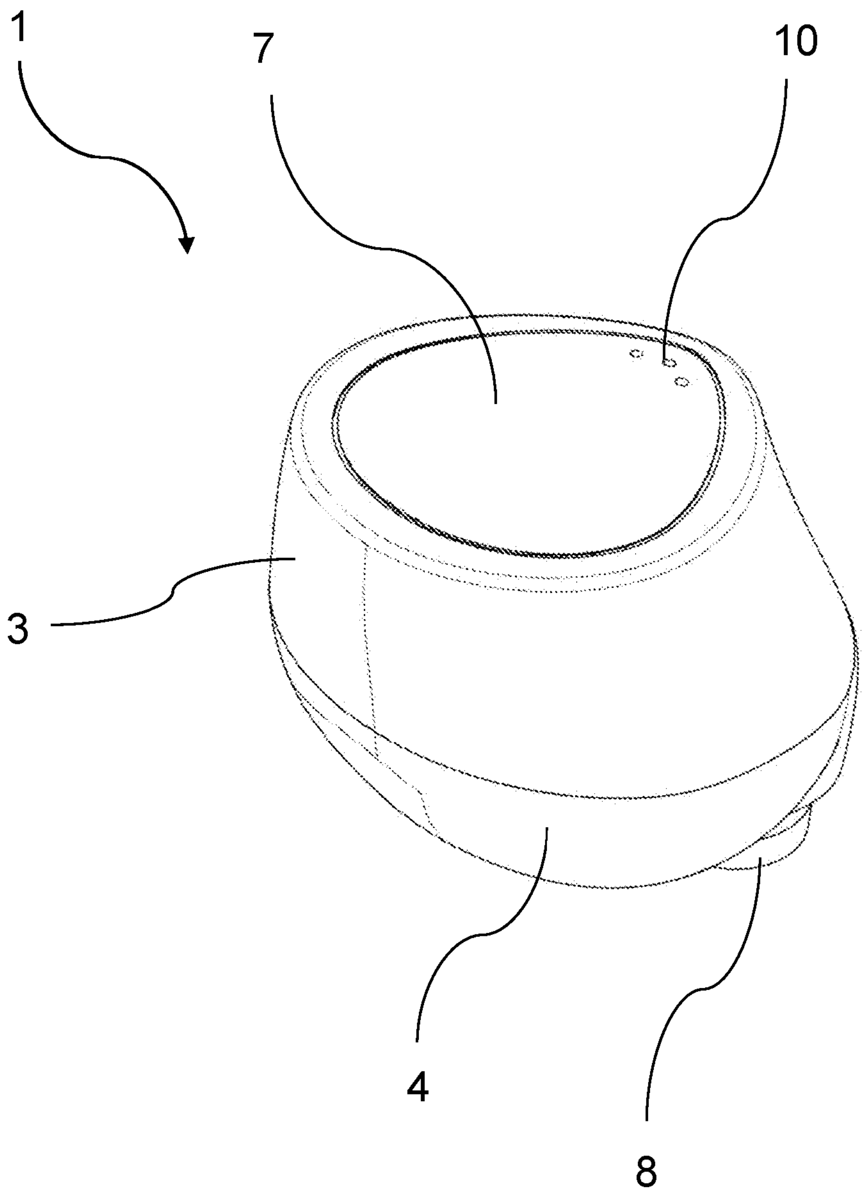
FIG. 3 shows an alternative view of the embodiment of a personal audio unit according to the present invention.

FIG. 3 shows an alternative view of the earbud 1. The microphone holes 10 are visible, located within the cap 7. The microphone holes 10 are located in a peripheral region of the cap 7, adjacent an edge of the aperture in the upper shell portion 3. The microphone holes 10 may be located in the cap 7 such that the microphone holes are as close as possible to the user's mouth when then earbud 1 is in use. This may improve sound quality of the user's voice as detected by the microphone unit in the earbud 1 and may reduce external noise interference.

Figure 4:
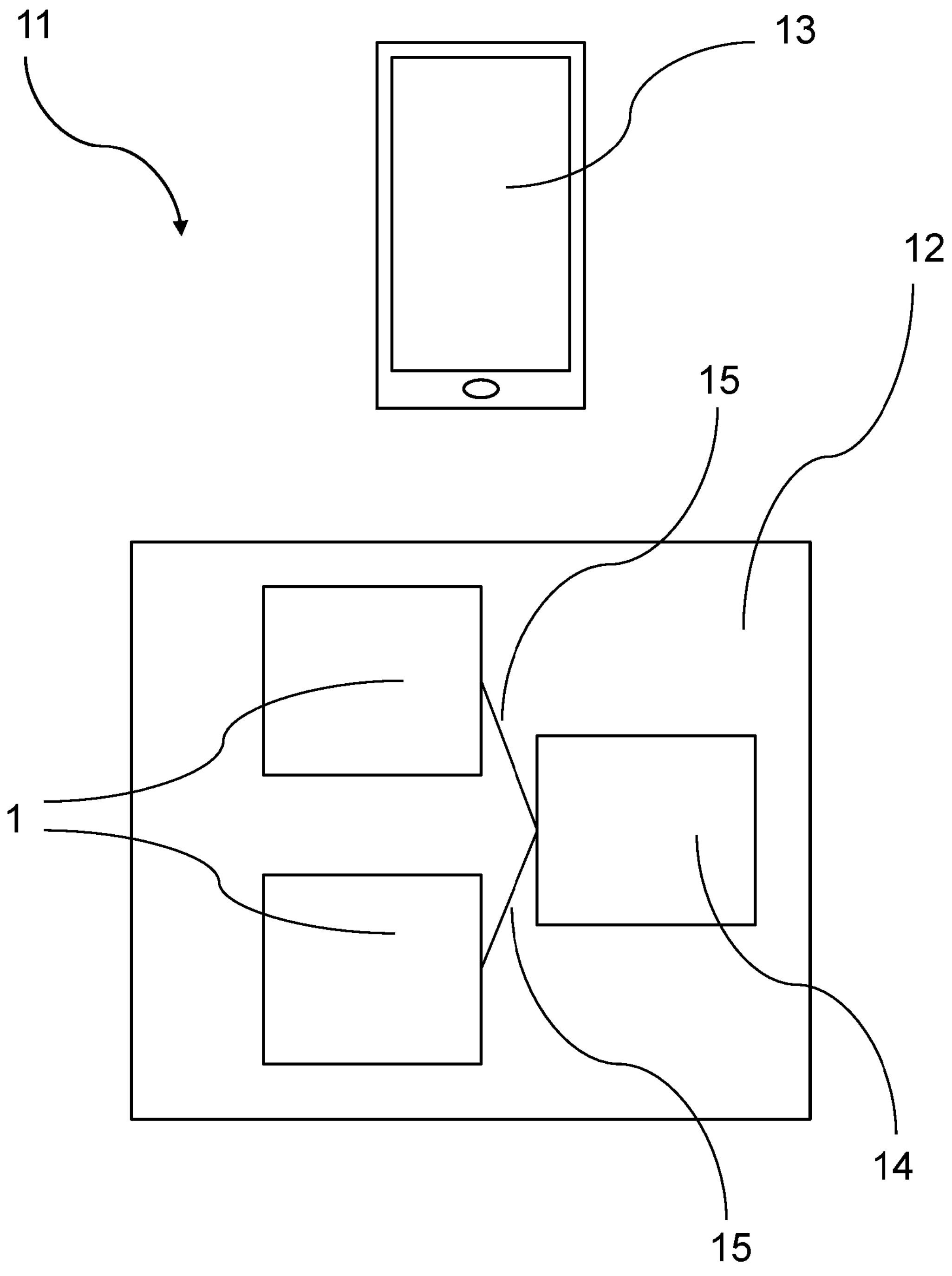
FIG. 4 shows a schematic overview of an embodiment of a personal audio unit system according to the present invention.

FIG. 4 schematically illustrates the earbud 1 in the context of a personal audio system 11. The system 11 includes a pair of earbuds 1, a charging/carrying case 12, and a wirelessly connected compute device 13. Where the earbuds 1 are provided as a pair of earbuds 1, the earbuds 1 may be shaped as right and left earbuds 1, one of each. The right earbud 1 may be shaped as a mirror image of the left earbud 1, so that the left earbud 1 is configured for snug engagement with a user's left ear and the right earbud 1 is configured for snug engagement with the user's right ear. In other embodiments, the two earbuds 1 may be shaped substantially identically. In some embodiments, the earbuds 1 are labelled as "Left" and "Right" (or "L" and "R"). The pair of earbuds 1 may be configured to wirelessly communicate with each other.

The wirelessly connected compute device 13 is configured to wirelessly connect with one or both of the earbuds 1. The wireless connection may be for the transmission of data from the compute device 13 to the earbuds 1 and from the earbuds 1 to the compute device 13. For example, the compute device 13 may transmit substantially real time sound data to the earbud(s) 1, which is then played back by one or both of the earbuds 1. In some embodiments, one or both of the earbuds 1 transmit sound data from the microphone unit in the earbuds 1 to the compute device 13. In some embodiments, the compute device 13 transmits sound data to one or both of the earbuds 1, which is then stored on one or both of the earbuds 1 for later playback (for example, when the wireless connection to the compute device 13 is unavailable). To this end, in some embodiments the earbud 1 includes a memory for data storage (for example, a RAM unit, for example a 4 gigabyte RAM storage unit). In some embodiments, the memory is configured to store audio data (for example, music or podcast content). In some embodiments, the wireless connection is a Bluetooth connection or a wi-fi connection. In some embodiments, the compute device 13 is one of a mobile phone, smart watch, computer, tablet computer, "phablet", music/video player, or any other suitably configured device. In some embodiments the earbud 1 is both wirelessly connectable (for example via a Bluetooth connection) and includes a memory for data storage. In this way the earbud 1 is more flexible in its use cases, depending on the availability of a suitable compute device 13.

The earbuds 1 can be housed within the charging/carrying case 12 when not in use. The charging/carrying case 12 includes a case power supply unit 14. When the earbuds 1 are located within the case 13, an electrical connection 15 between the earbuds 1 and the case power supply unit 14 is formed. The case power supply unit 14 thereby charges the power supply unit (not shown) within each earbud 1.

Each earbud 1 may include a magnet (not shown). The magnet is configured to engage with a corresponding magnet or ferritic material in the charging/carrying case 12. The magnetic interaction between earbud 1 and case 12 retains the earbud 1 in place in the device and serves to provide precise alignment of the charging contacts of the earbud with the case power supply unit 14.

Figure 5:
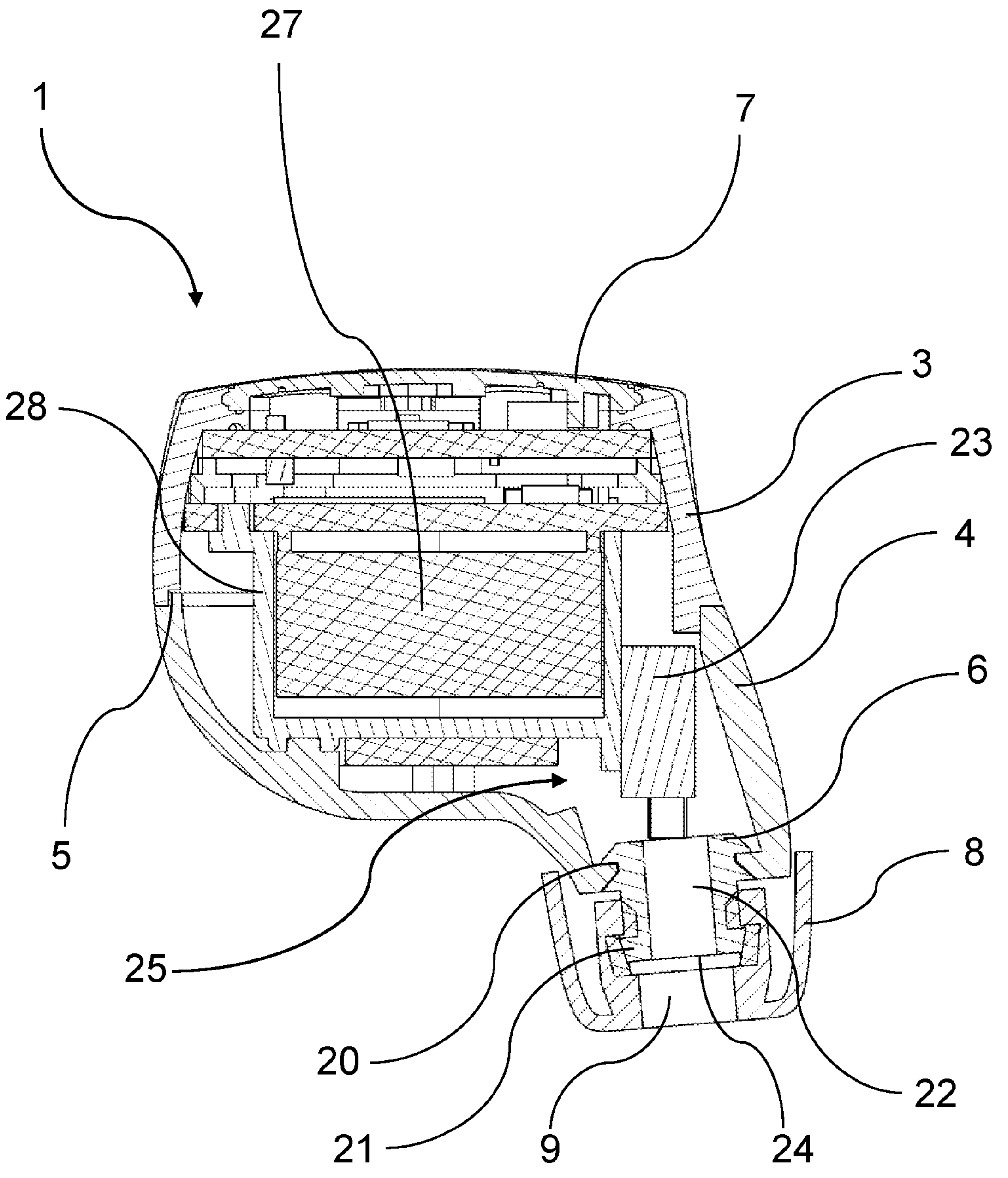
FIG. 5 shows a cross sectional view through an embodiment of a personal audio unit according to the present invention.

FIG. 5 shows a cross section through earbud 1. The externally visible components from FIGS. 1, 2, and 3 are similarly labelled in FIG. 5.

FIG. 5 particularly illustrates the interface of the lower shell portion 4 with the nib 6. During manufacture, the nib 6 is pushed into the port 20, which is formed in the lower shell portion 4. The earbud tip 8 is engaged with the exposed, distal, end 21 of the nib 6.

The nib 6 includes a sound passage 22 formed therethrough. The passage permits the transmission of sound from a sound driver 23. The nib 6 includes a breathable membrane 24. The breathable membrane 24 substantially prevents ingress of liquid and dust and dirt from outside the earbud 1 through the breathable membrane 24 into the cavity inside the shell 3, 4. The breathable membrane may be a waterproof and breathable membrane. Suitable breathable membranes are available from GORE, and other suppliers. In some embodiments, the breathable membrane may have a thickness between 0.1 and 1.0 millimetres, for example 0.25 millimetres. The breathable membrane 24 may be coated on at least one surface with an adhesive to aid watertight attachment of the breathable membrane 24 to the nib and or the housing. The breathable membrane 24 may also or alternatively be trapped and held in position between the nib and housing that engages with the nib. The sound created at the sound driver 23 passes along the sound passage 22, through the breathable membrane 24 and out of the aperture 9. At this point, the sound is transmitted into the user's ear canal, which is engaged with the earbud tip 8.

The port 20 in the lower shell portion 4 forms an inlet into the internal cavity 25 of the earbud 1. The internal cavity 25 of the earbud 1 houses a plurality of electronic components, which is an example of electronics module. These components may include any of: sound driver, power supply unit (e.g. battery), microcontroller, wireless connectivity module, switch for user input to the earbud 1, user feedback unit (for example, a light or series of lights). The electronic components inside the cavity 25 do not completely fill the cavity 25 formed by the shell 3, 4; some empty space remains. The switch(es) may constitute a multi-functional button that permits control of software running on the earbud 1 (for example, skip song, pause, activate a particular mode of operation).

A liquid encapsulant is, during manufacture, introduced into the cavity 25. The liquid encapsulant is introduced via the port 20 in the shell, which forms a filling port. The liquid encapsulant substantially fills the spaces between the components that are located within the cavity 25. In other embodiments, a separate liquid introduction port may be included, for example at an interface or join between the shell components 3, 4. The liquid introduction port forms a filing port. In such embodiments, after liquid encapsulant introduction, a plug may be inserted into the aperture formed at the join between the shell portions. The plug may be inserted before the encapsulant solidifies. The plug may include a protrusion that extends into the liquid encapsulant. The liquid encapsulant solidifies around the protrusion, retaining the plug in place. In some embodiments, the protrusion is a hoop that extends into the liquid encapsulant. See FIGS. 7 and 8, for example.

The present inventors have found that, regardless of liquid introduction aperture (via the nib aperture or another aperture) it is advantageous to have an internal surface of the shell that faces towards the aperture be generally inclined, and not flat during liquid introduction. In this way, it has been found that air pockets/bubbles remaining in the solidified encapsulant may be reduced. Reduction of air pockets/ bubbles increases the strength of the finished PAU. In particular, the first surface that the initial portion of liquid encapsulant touches is inclined to the flat. This permits the liquid to flow naturally to a low point, and gradually fill and cover the lower surface. This may promote complete filling of the cavity.

Figure 6:
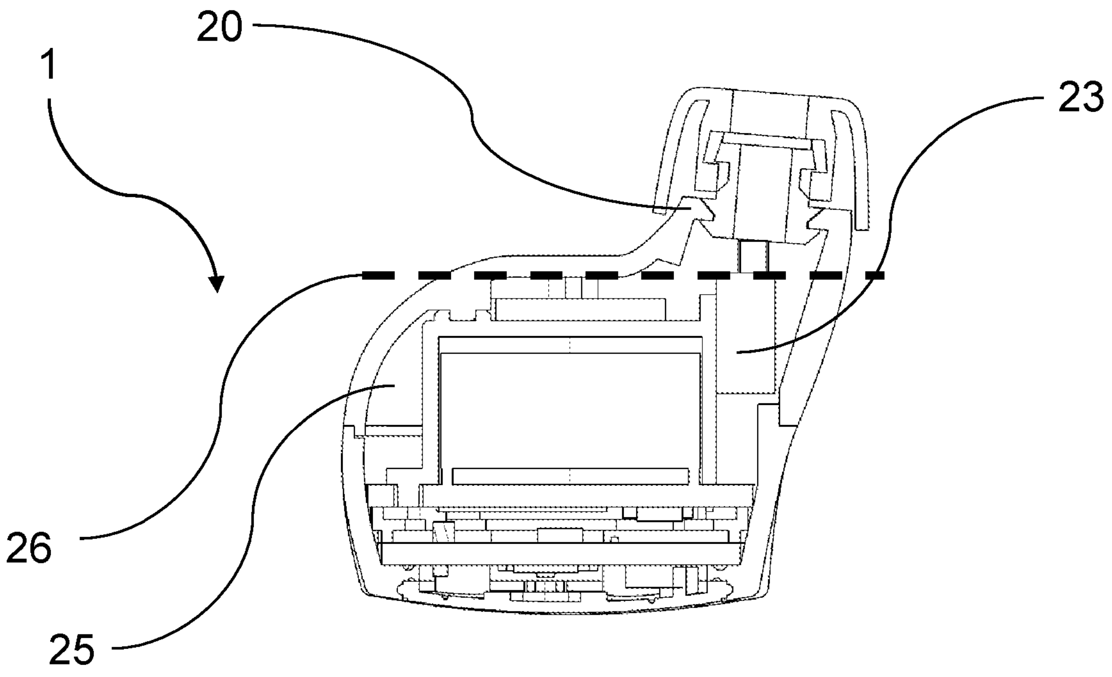
FIG. 6 shows a cross sectional view through an embodiment of a personal audio unit according to the present invention.

FIG. 6 illustrates a fill level 26 of encapsulant into the earbud 1 via the port 20. Note that the orientation of the earbud 1 in FIG. 6 is reversed compared to FIG. 5. The fill level 26 of the liquid encapsulant leaves the sound output portion of the sound driver 23 free from liquid encapsulant. The liquid encapsulant is injected between the gap between the output portion of sound driver 23 and the opening of the port 20. During encapsulant introduction, the opening of the sound driver 23 may be temporarily blocked, to prevent any inadvertent introduction of liquid encapsulant into the sound driver 23.

The liquid encapsulant, after introduction into the cavity 25 hardens into a solid encapsulant during a curing step. The hardened encapsulant, which is in close conformity with components inside the earbud, protects those components from damage from, for example, vibration and shock. The hardened encapsulant also increases the structural integrity of the shell 3, 4. The earbud 1 is thereby strengthened and resistance to catastrophic failure from, e.g. crushing forces, is improved. The encapsulant also increases the water and sweat and dust/dirt resistant of the earbud 1.

In some embodiments, the body of the sound driver may be housed or coated in a flexible or elastic material, for example a latex or silicone. Once the encapsulant hardens around the coated sound driver body, the flexible or elastic material may provide cushioning to the sound driver 23, permitting slight movement between sound driver 23 and the earbud 1. This may improve sound performance.

In some embodiments, the shell 3, 4 includes a pressure equalisation aperture. The pressure equalisation aperture allows the pressure inside the shell to equalise during liquid encapsulant introduction. This may assist with ensuring the liquid encapsulant intrudes into all intended voids/interstices in the cavity.

In some embodiments, the encapsulant is a potting compound, for example a low viscosity potting compound. In some embodiments, the encapsulant, in its liquid form, is a molten polyamide compound. In some embodiments, the encapsulant is a two-part epoxy resin. In some embodiments, once cured, the encapsulant has a Shore hardness of 84D. In some embodiments, the encapsulant may be an electric grade 832 series epoxy. In some embodiments, the combining of the two parts of the epoxy resin may lead to an exothermic reaction. The temperature of the liquid encapsulant may therefore rise slightly. In turn this may decrease a viscosity of the liquid encapsulant. In turn this may improve a filling factor of the liquid encapsulant, making it easier to fill all available space in the cavity 25. In some embodiments, the temperature of the liquid encapsulant is less than around 50 degrees Celsius, for example, around 35 degrees Celsius. In this way, damage to electronic components from heat, for example, the power supply unit, may be avoided.

Figure 7:
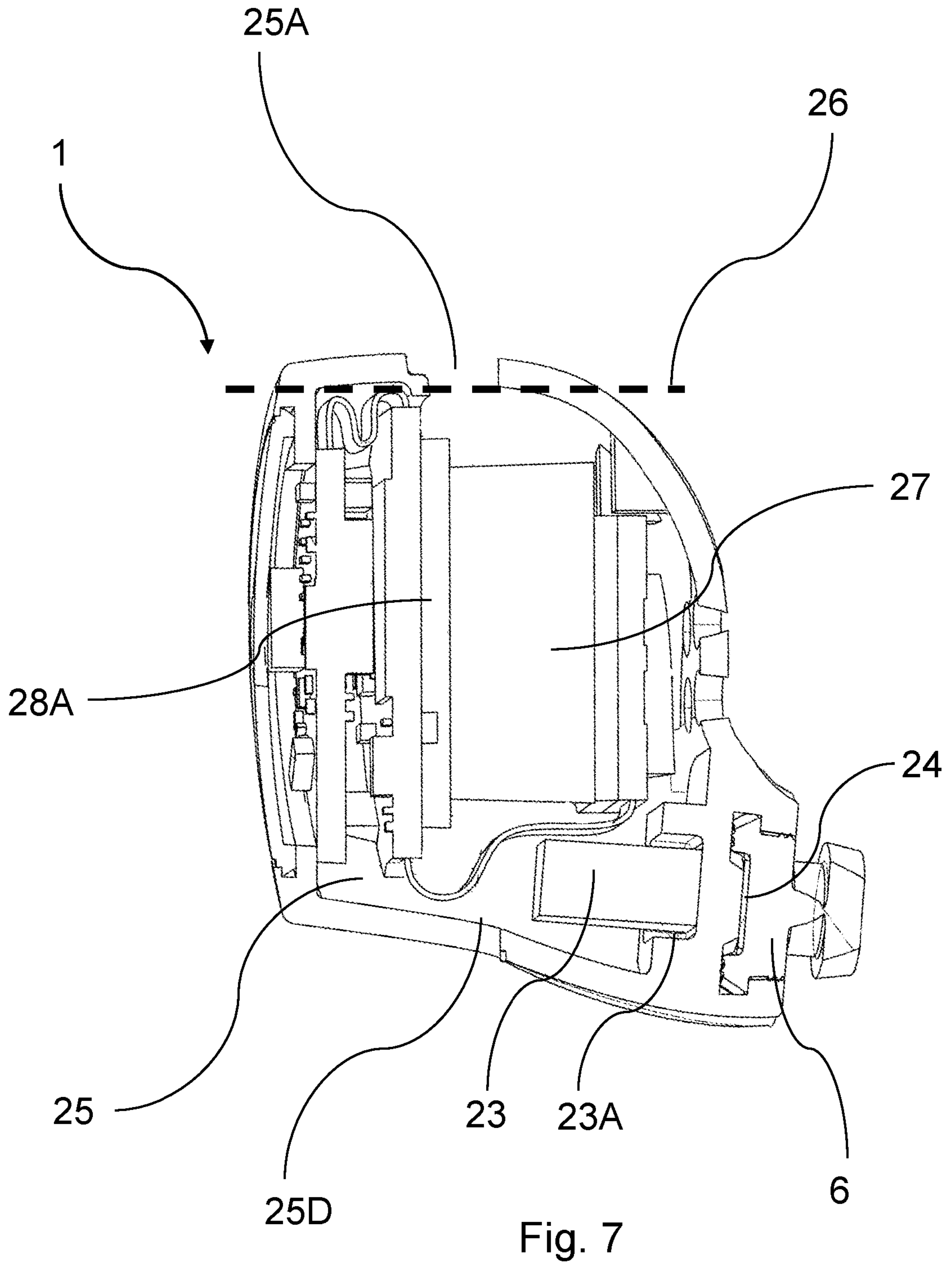
FIG. 7 shows a cross sectional view through an alternative embodiment of a personal audio unit according to the present invention.
Figure 8:
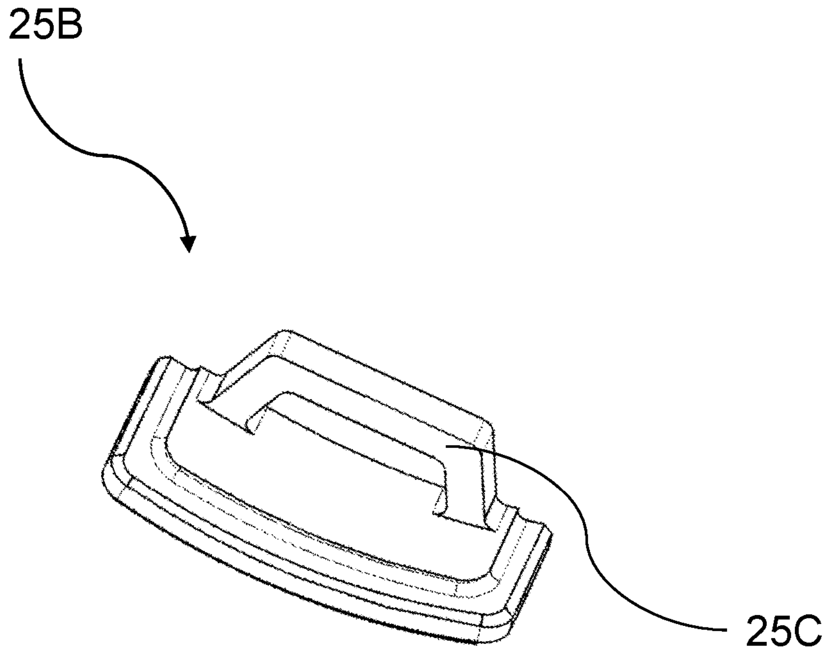
FIG. 8 shows a plug in accordance with the present invention.

FIG. 7 shows an alternative embodiment of PAU 1. In this embodiment, the liquid encapsulant is introduced into the cavity 25 via an aperture 25A formed at the join line between the shell portions 3, 4. In such embodiments, after liquid encapsulant introduction, a plug 25B is inserted into the aperture 25A. The plug (see FIG. 8) is engaged with the aperture 25A after the encapsulant is introduced to the cavity 25, and before the encapsulant solidifies. The plug 25B includes a protrusion 25C that extends into the liquid encapsulant. The liquid encapsulant solidifies around the protrusion 25C, retaining the plug 25B in place. In some embodiments, the protrusion 25C is a hoop that extends into the liquid encapsulant. The protrusion of the plug 25B extends below the fill level 26 of the liquid encapsulant. The plug 25B may include a label indicating as "Left" and "Right" (or "L" and "R") for the respective PAU 1 into which the plug 25B is engaged.

FIG. 7 also illustrates the lower internal surface 25D of the cavity 25. The lower internal surface 25D of the cavity 25 is the internal surface of the cavity 25 that opposes the opening via which the liquid encapsulant is introduced. In the embodiment of FIG. 7, this is the aperture 25A. The lower internal surface 25D is generally inclined, and not orientated flat. This inclination may be achieved by orientating the PAU 1 during liquid encapsulation introduction, and or via the shape of the internal surface. In this way, it has been found that air pockets/bubbles remaining in the solidified encapsulant may be reduced. Reduction of air pockets/bubbles increases the strength of the finished PAU. In particular, the first surface that the initial portion of liquid encapsulant touches (the lower internal surface 25D) is inclined to the flat. This permits the liquid encapsulant to flow to a low point on the lower internal surface, and gradually fill and cover the lower internal surface 25D. The cavity is then subsequently filled with liquid encapsulant. The inclined lower internal surface 25D may promote complete filling of the cavity 25 with liquid encapsulant.

FIG. 7 also illustrates an alternative location for the breathable membrane 24. The breathable membrane 24 substantially prevents ingress of liquid and dust and dirt from outside the earbud 1 through the breathable membrane 24 into the cavity inside the shell 3, 4. The breathable membrane may be a waterproof and breathable membrane. Suitable breathable membranes are available from GORE, and other suppliers. In some embodiments, the breathable membrane may have a thickness between 0.1 and 1.0 millimetres, for example 0.25 millimetres. The breathable membrane 24 may be coated in an adhesive to aid watertight attachment to the nib and or the housing. In the embodiment of FIG. 7 the breathable membrane 24 is retained and held in position between the nib 6 and housing that engages with the nib 6. Such retention and holding may also aid watertight engagement.

FIG. 7 also illustrates that the shell portion that engages the driver 23 includes a driver engagement socket 23A sized and shaped to engage a least a sound transmission portion of the driver 23. The driver engagement socket 23A may be sized to accommodate a driver 23 that is coated in a resilient material, for example a latex or silicone. The driver 23 may be engaged with the driver engagement socket 23A prior to the introduction of liquid encapsulant. This may protect the sound transmission portion of the driver 23 from coming into contact with the liquid encapsulant.

Returning to the embodiment of FIG. 5, the battery 27 is located within a cup 28. The cup 28 may be sealed around the peripheral edge to a PCB of the electronics component, thereby forming a battery cavity inside the cup 28. The battery 27 is thereby separated from the encapsulant. The cup 28 is formed from a rigid plastic material. In some other embodiments, the cup 28 may be formed from a foam, for example, a closed cell foam. In some embodiments, the cup 28 closely conforms to the shape of the battery 27. In some other embodiments, the cup 28 has a peripheral wall that is shaped to permit a flat landing zone on the PCB to be formed to which the cup 28 is attached. For example, the shape of a peripheral edge of the cup 28 may be designed to permit a flat landing zone on the PCB to which the cup 28 is attached to be formed, where the landing zone is substantially absent of electronic components. In some embodiments, this means that a peripheral wall of the cup 28 has a non-circular shape.

In some other embodiments, the cup 28 is omitted. In such embodiments (for example, the embodiment of FIG. 7) a layer of resilient material 28A may be provided adjacent the battery 27, to permit some level of battery expansion in the event of battery malfunction. The resilient material 28A may also or alternatively be capable of absorbing battery exhaust/gas, in the event of a battery malfunction. The layer of resilient material 28A may be a closed cell foam. The layer of resilient material may be provided between the battery and the adjacent PCB.

Figure 9:
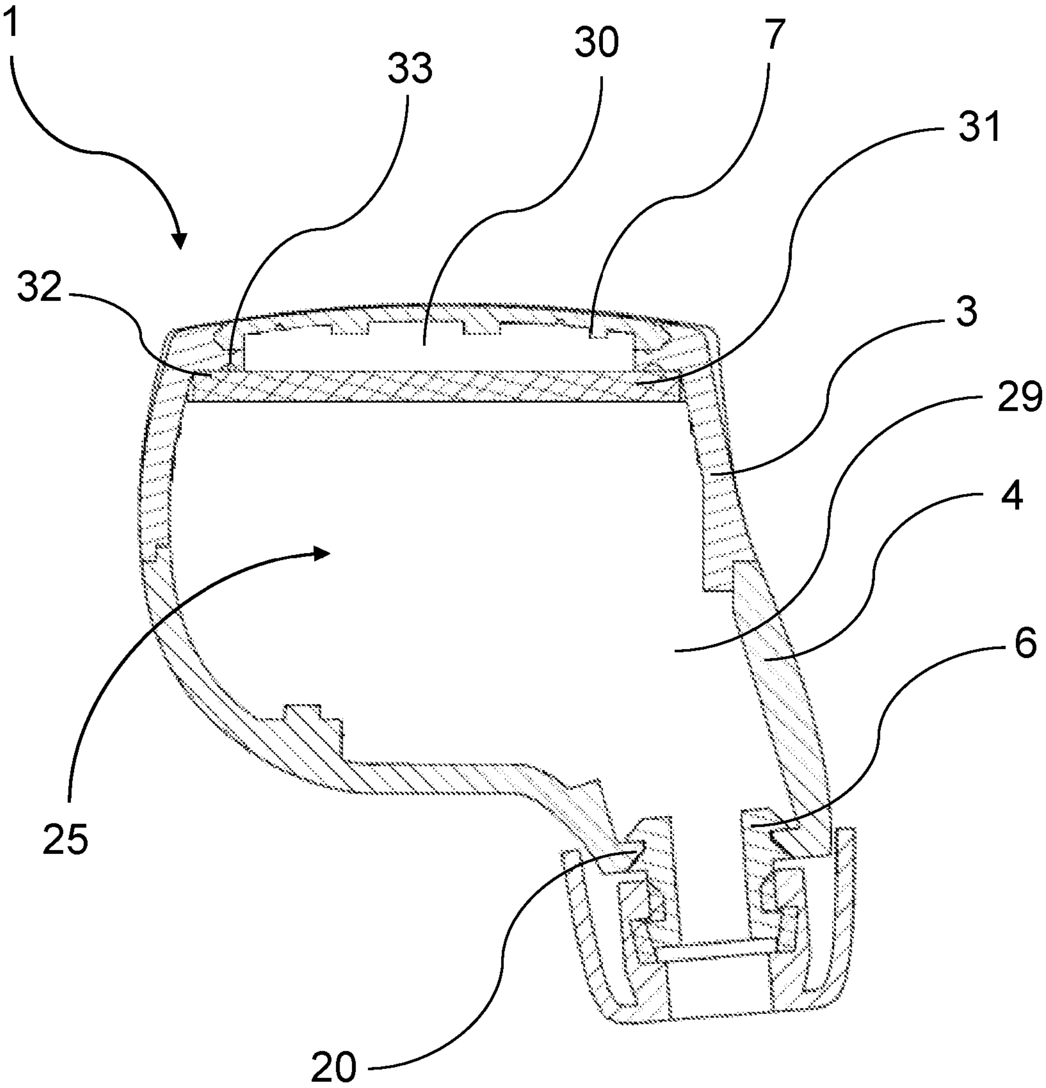
FIG. 9 shows a simplified cross-sectional view through an embodiment of a personal audio unit according to the present invention.

FIG. 9 illustrates a simplified illustration of earbud 1, in which most of the internal electronics module is omitted for explanation purposes. Within the cavity 25, two voids are formed: a lower void 29 and an upper void 30. The lower and upper voids 29, 30 are partitioned by an interface printed circuit board (PCB) 31. The interface PCB 31 is part of the electronics module. In other embodiments, a different component or a dedicated wall component may be used to partition the cavity 25.

The interface PCB 31 is mounted within the cavity 25 to but against a peripheral shoulder 32 formed on an internal surface of the upper shell portion 3. The connection between the shoulder 32 and the PCB 31 substantially prevents the passage of the liquid encapsulant from the filling port 20 into the upper void 30. In some embodiments, the lower and upper voids 30, 29 are substantially hermetically sealed from each other by the interface PCB 31. A surface of shoulder 32 includes a channel 33 formed therein (for example a scalloped channel). The channel 33 may form a continuous loop around the shoulder 32. During manufacture a sealant may be introduced into the channel 33. The sealant may assist in forming a hermetic seal between the PCB 31 and the shoulder 32. The sealant may be a silicone. In some embodiments, an adhesive may be used in place of a sealant. In some other embodiments, a combined adhesive and sealant may be used.

The cap 7 may bound a portion of the upper void 30. The face of the interface PCB 31 that faces into the upper void 30 includes electronic components with which the user interacts directly. These components may include, but are not limited to, any of: one or more switches, one or more lights, at least the sound responsive part of the microphone unit, and at least a portion of a wireless communication antenna. In some embodiments, the upper surface of the interface PCB 31 includes a contact dome switch. Because the upper void 30 is not filled with liquid encapsulant, these components are not exposed to the liquid encapsulant, which could otherwise damage the efficacy of those components.

Figure 10:
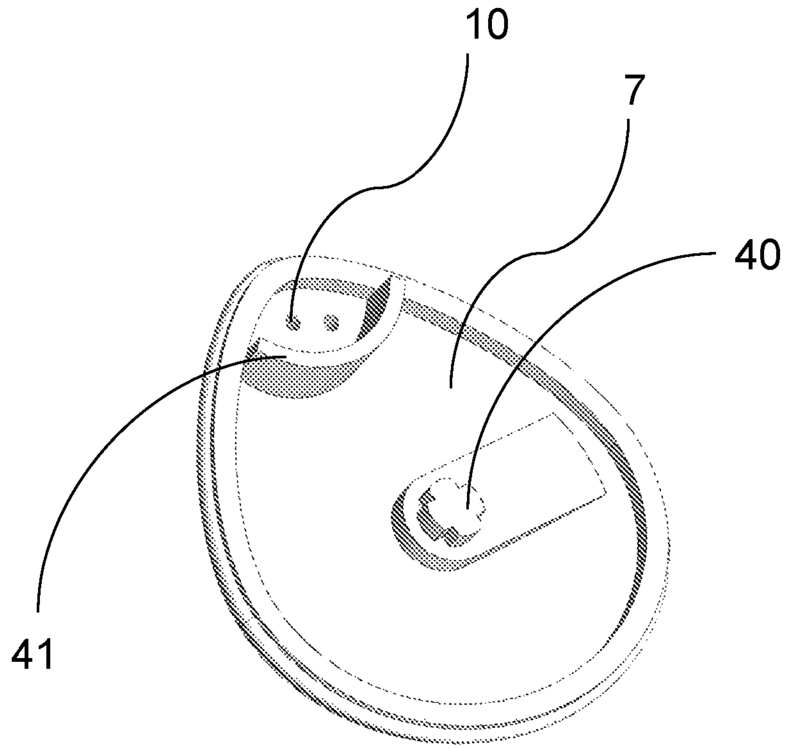
FIG. 10 shows a view of a cap component in accordance with an embodiment of a personal audio unit according to the present invention.

FIG. 10 shows the cap 7. The internal surface of the cap 7 includes an interface projecting portion 40. When the cap 7 is connected to the earbud 1, the interface projecting portion 40 protrudes into the upper void 30. The interface projection portion 40 is sized and shaped for engagement with a switch located in the upper void 30. This may reduce the travel necessary of the cap 7 before the switch is activated by a user pressing on the cap 7. In embodiments in which the cap is integral with the shell, the cap may nevertheless include the interface projecting portion 40. The material at the shell/cap may be flexible enough (at least in the region of the cap) to permit the necessary travel for the activation of the switch.

The cap 7 also includes a microphone isolation wall 41. The microphone isolation wall 41 divides the upper void 30 into two portions, a microphone portion and light portion. The microphone portion includes at least the sound responsive part of a microphone. The light portion may contain one or more lights. The microphone isolation wall may prevent light from the light(s) bleeding out from the microphone hole(s) 10. The microphone isolation wall 41 may engage an upper surface of the interface PCB.

Returning to FIG. 9, the lower void 29, though not shown in FIG. 9, includes other electronics components and circuit board(s) and the power supply unit of the earbud 1.

In some embodiments, the earbud 1 includes at least one support structure within the cavity 25. In some embodiments, a support structure in the lower void 29 engages the electronics module, supporting the electronics module in position at least while the liquid encapsulant is introduced into the cavity 25. In some embodiments, the support structure is an integrally formed part of the shell 3, 4. Liquid passageways between the support structure and the electronics module may be formed to permit the passage of the liquid encapsulant around the electronics module during manufacture.

Figure 11:
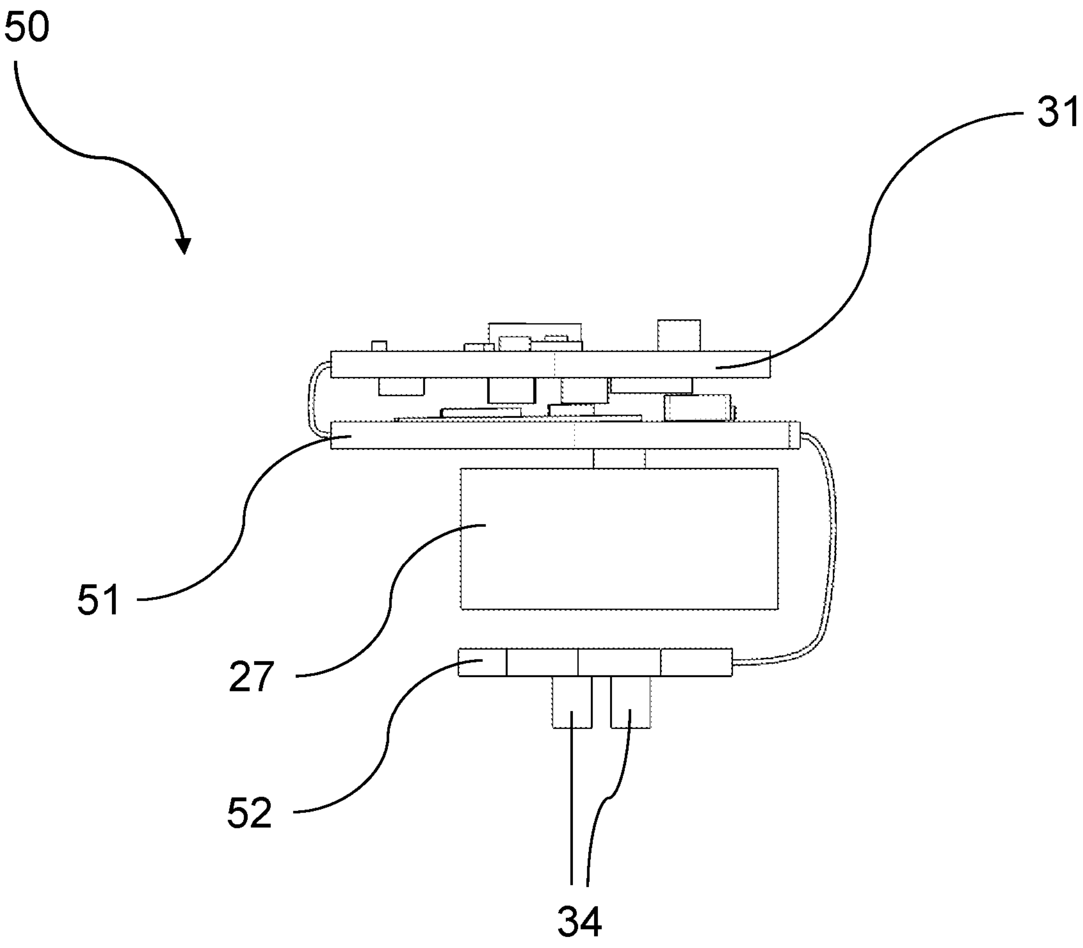
FIG. 11 shows a cross sectional view through an electronics module in accordance with an embodiment of a personal audio unit according to the present invention.
Figure 12:
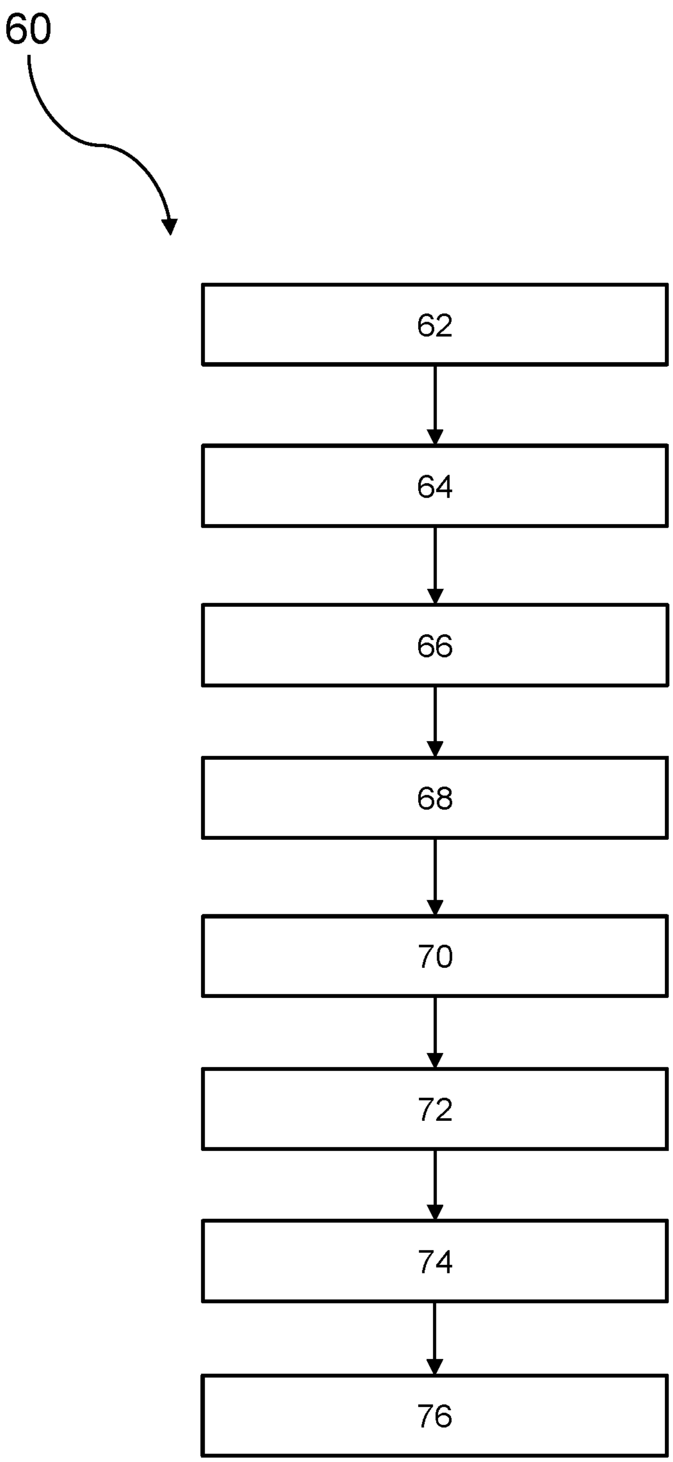
FIG. 12 shows an overview of a method of manufacture in accordance with an embodiment of the present invention.

FIG. 11 shows an electronics module 50 in accordance with an embodiment. The electronics module 50 is formed from three flexibly interconnected printed circuit boards (PCBS): the interface PCB 31, the primary PCB 51 and the charging PCB 52. In other embodiments, the electronics module 50 of the earbud 1 may take a different form, for example more or fewer PCBS. In some embodiments, the electronics module 50 may have a single PCB. The thickness of a PCB substrate may be between 0.2 and 1.5 millimetres, for example 1 millimetre. Components mounted to the PCB substrate may increase the thickness of the electronic module. The PCB substrate may be a Glass Fiber Epoxy Laminate, or "FR4". In some embodiments, the PCB substrate may be a multilayer substrate, for example, a 2-layer, 4, layer, 6-layer, or B-layer PCB substrate. In other embodiments, the PCB substrate may have an odd number of layers. Multilayer substrates (for example, B-layer PCB substrates) may be particularly susceptible to damage from flexing or vibrating. As such, protecting such PCBs with the encapsulant of the present invention may be particularly advantageous. The battery 27 is electrically connected to the primary PCB 51. The battery 27 is an example of a power supply unit. As above, in some embodiments, the battery is located within a cup 28 (see FIG. 5). The battery 27 is electrically connected to the electrical charging contacts 34 on the charging PCB 52. The electrical contacts are exposed via a pair of apertures in the lower shell portion 4, when the electronic module is installed in the shell 2. The charging PCB 52 also includes a pair of data contacts (not shown). The data contacts are also exposed via a pair of apertures in the lower shell portion 4, when the electronic module is installed in the shell 2. The two data contacts and the two electrical contacts may be arranged at the four corners of a square on the lower shell portion 4. In some embodiments, the electrical contacts may have dual functionality-used for both charging and data transfer.

A method of manufacture 60 of the earbud 1 according to an embodiment of the present invention will now be described. Though reference is made to the earbud 1 of the preceding figures, the method is applicable to the manufacture of various personal audio devices.

As shown in FIG. 10, the method 60 includes a shell formation step 62. During the shell formation step 62 the upper and lower shell portions 3, 4 are formed. The shell formation 62 may include moulding the shell portions 3, 4. The shell portions 3, 4 may be formed from a rigid moulded plastic material.

The method 60 further includes an electronics module formation step 64. In the electronics module formation step 64, the electronic components that are to be housed within the shell are connected to one another to form the electronics module. The electronics module is described in respect of the preceding figures. The electronics module formation step 64 may include electronically and electrically connecting the various components to one another, as necessary. Forming the electronics module as a single unit for housing in the shell 3, 4 may improve the manufacturability of the earbud 1.

The method 60 further includes a shell closure step 66. The shell closure step includes connecting the upper and lower shell portions 3, 4. At the mutual connection point of the upper and lower shell portions 3, 4 an adhesive is applied prior to connection of the upper and lower shell portions 3, 4. The upper and lower shell portions 3, 4 are connected to one another with the electronics module located within the cavity 25 formed by the upper and lower shell portions 3, 4.

The method 60 further includes a cap attachment step 68. In this step the flexible cap 7 is attached to an aperture formed in the upper shell portion 3. At the mutual connection point of the upper shell portion 3 and the cap 7 an adhesive is applied prior to connection. In some embodiments, the cap attachment step 68 is performed after the encapsulant introduction step 72 and the curing step 74.

In some embodiments, the cap is integrally formed with the shell, for example with the upper shell portion 3. The cap is therefore formed during the shell formation step 62, and the specific cap attachment step 68 is omitted.

The method 60 includes a vent passage formation step 70. In this step, a pin is introduced through a venting aperture through the shell. The pin is left in situ during the encapsulant introduction step 72 and the curing step 74 (see below). After the curing step 74, the pin is withdrawn. A venting passage is thus formed between the battery 27 and the environment. In embodiments in which the battery 27 is located within cup 28, the venting passage may extend to the inside of the cup 28. More specifically, the cup 28 may include a cup boss, and the shell include a shell boss, the cup boss and the shell boss engaging with one another. The venting passage may pass through the interconnection of the cup boss and the shell boss. In general, the venting passage forms a pathway for the venting of gases produced during a battery malfunction. The venting passage passes through the solidified encapsulant. This improves the safety of the earbud 1. In some embodiments, a portion of the venting passage that passes through the shell (or shell portion) is aligned with a direction of removal of the shell (or shell portion) from the mould in which it is formed during the shell formation step 62. This may allow for ease of manufacture. The venting passage may include a venting passage breathable membrane. The venting passage breathable membrane substantially prevents ingress of liquid from outside the earbud 1 through the venting passage into the cavity inside the shell 3, 4. The breathable membrane may be a waterproof and breathable membrane. Suitable breathable membranes are available from GORE. 2. In some embodiments, the breathable membrane may have a thickness between 0.1 and 1.0 millimetres, for example 0.25 millimetres.

In some other embodiments, the venting passage and vent passage formation step 70 is/are omitted.

The method 60 further includes an encapsulant introduction step 72. In the encapsulant introduction step 72 an encapsulant liquid is introduced into the voids within the cavity 25 formed by the shells 3,4. The liquid encapsulant may contact at least a portion of the electronics module and an internal surface of at least the lower shell portion.

The liquid encapsulant may be introduced into the cavity under pressure. This may assist with ensuring the liquid encapsulant intrudes into all intended voids within the cavity within and around the electronics module.

Between 3 and 30 grams of liquid encapsulant may be introduced into a single PAU. For example, between 5 and 20 grams of liquid encapsulant, for example between 8 and 15 grams of liquid encapsulant, for example approximately 10 grams of liquid encapsulant.

During the introduction of the liquid encapsulant into the cavity, the earbud 1 may be vibrated in a vibration step. This may assist with ensuring the liquid encapsulant intrudes into all intended voids in the cavity. This may also mitigate the presence of air bubbles or air pockets within the liquid encapsulant. The vibration step may happen during or after the encapsulant introduction step 62.

In some embodiments, the liquid encapsulant is introduced into the cavity via the port 20. The liquid encapsulant may be introduced between the sound driver and edge of the port 20. The fill level of the liquid encapsulant leaves the sound output portion of the sound driver 23 free from liquid encapsulant. The liquid encapsulant may be injected into the gap between the output portion of sound driver 23 and the opening of the port 20. During encapsulant introduction, the opening of the sound driver 23 may be temporarily blocked, to prevent any inadvertent introduction of liquid encapsulant into the sound driver 23.

In other embodiments, the liquid encapsulant may be introduced into the cavity via a different aperture in the shell 3, 4. In particular, the liquid encapsulant may be introduced into the cavity via an aperture formed at the join line between the shell portions 3, 4. See FIG. 7, for example. In such embodiments, after liquid encapsulant introduction, a plug may be inserted into the aperture formed at the join between the shell portions. See FIG. 8, for example. The plug may be inserted before the encapsulant solidifies. The plug may include a protrusion that extends into the liquid encapsulant. The liquid encapsulant solidifies around the protrusion during the curing step, retaining the plug in place. In some embodiments, the protrusion is a hoop that extends into the liquid encapsulant.

In some embodiments, the shell 3, 4 includes a pressure equalisation aperture. The pressure equalisation aperture allows the pressure inside the shell to equalise during liquid encapsulant introduction. This may assist with ensuring the liquid encapsulant intrudes into all intended voids in the cavity. The pressure equalisation aperture may be closed after the encapsulant introduction step 72.

The method 60 further includes a curing step 74. During the curing step 74, the liquid encapsulant within the shell cavity hardens into a solid. The curing step 74 may include holding the earbud 1 substantially motionless for at least a predetermined curing time. The predetermined curing time may be between 30 mins and 24 hours. The liquid encapsulant may have a setting time of around 60 minutes.

The method 50 further includes a closing step 76. The closing step 76 includes closing the port 20 via which the encapsulant was introduced into the cavity. In embodiments in which the encapsulant is introduced via the port 20, the closing step 76 may include attaching the nib 6 to the port 20. The closing step 76 may occur before, during or after the curing step 74.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organisational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

What is claimed is:

1. A personal audio unit, PAU, comprising:

a shell forming a cavity within the shell;

an electronics module located within the cavity;

wherein the cavity includes a solidified encapsulant contacting at least a portion of the electronics module and an internal wall of the shell; and wherein the cavity is partitioned into an upper void and a lower void; and wherein the encapsulant is located in the lower void, and the upper void is substantially free of encapsulant.

2. A PAU according to claim 1, wherein the electronics module comprises a power supply unit located within a cup, the cup being located within the cavity.

3. A PAU according to claim 2, wherein the cup is substantially surrounded by the encapsulant.

4. A PAU according to claim 1, wherein the PAU includes a sound driver configured to provide sound to a user, wherein a sound emitting portion of the sound driver is exposed from the encapsulant.

5. A PAU according to claim 1, wherein the cavity is partitioned by a partition portion of the electronics module.

6. A PAU according to claim 5, wherein an upper surface of the partition portion that faces into the upper void includes at least one user interface component.

7. A PAU according to claim 1, wherein the upper void is at least partially bounded by a flexible wall.

8. A PAU according to claim 1, wherein the electronics module includes a wireless communication unit.

9. A PAU according to claim 1, wherein the PAU is an earbud.

10. A PAU according to claim 1, wherein the PAU is a hearing aid.

11. A personal audio system including a pair of PAUs, each PAU of the pair being according to claim 1.

12. A personal audio system according to claim 11, further including a case configured to house the pair of PAUs.

* * * * *